United States Patent Office 3,350,767
Patented Nov. 7, 1967

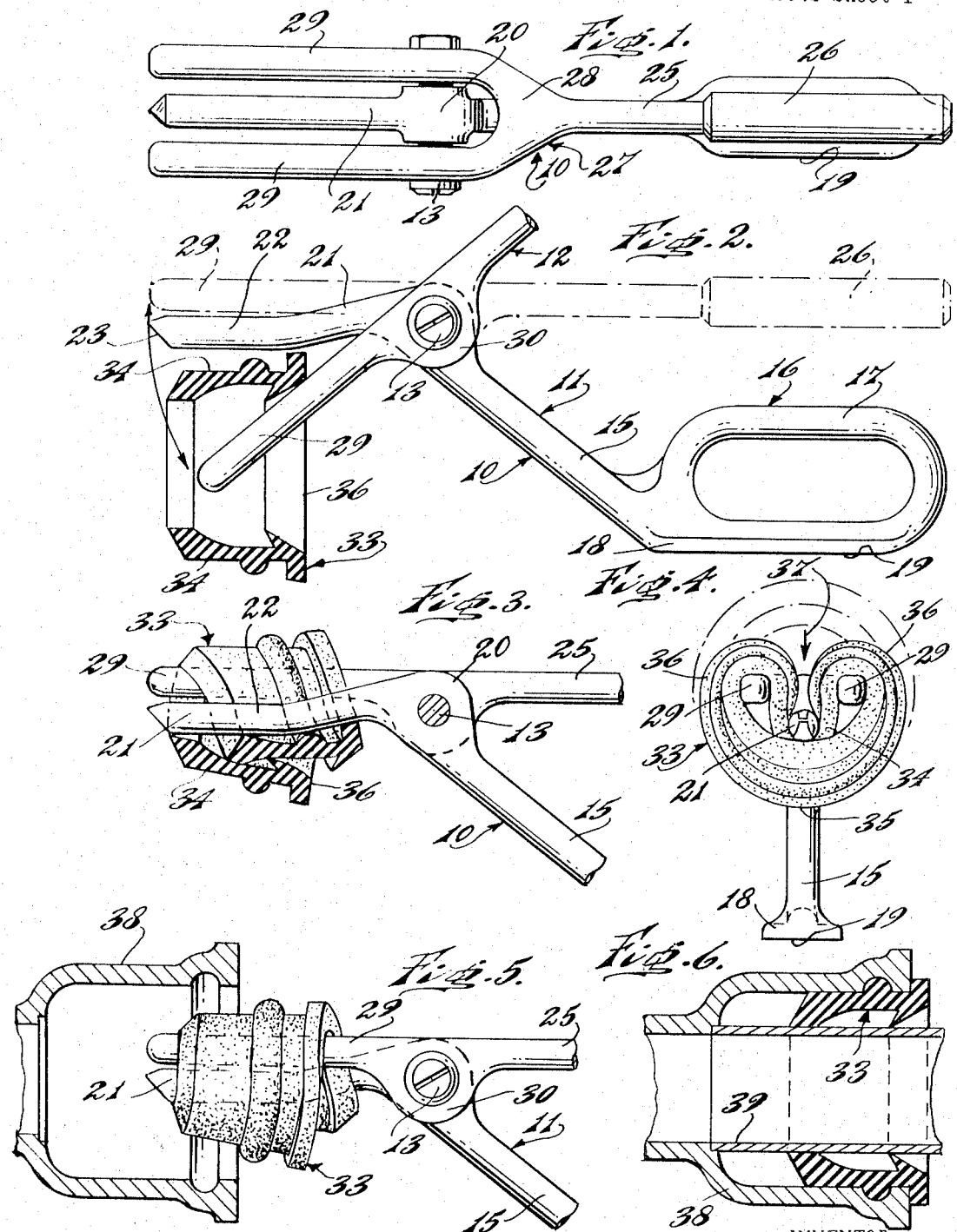

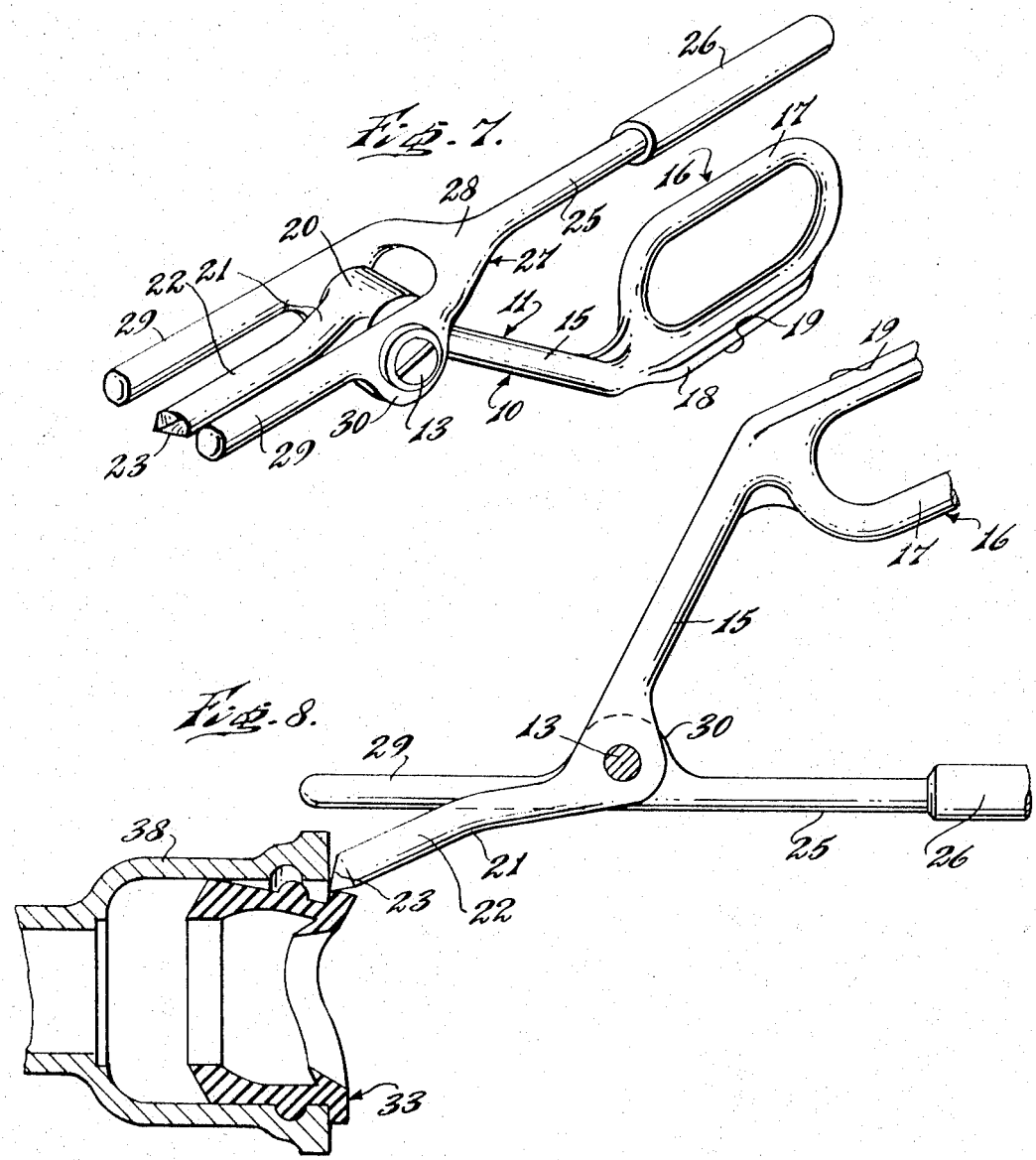

3,350,767
GASKET-INSERTION TOOL
John J. Yannuzzi, 124 E. Holly St.,
Hazleton, Pa. 18201
Filed June 22, 1966, Ser. No. 559,484
2 Claims. (Cl. 29—235)

ABSTRACT OF THE DISCLOSURE

This invention is concerned essentially with a tool having pivoted levers carrying interdigitated tines and relatively swingable with the levers to fold a gasket carried by the tines for insertion into a soil pipe, or the like.

---

This invention relates generally to tools for insertion of gaskets in soil pipe.

While the device of the present invention has been primarily developed and employed for use in insertion of soil-pipe gaskets of the type described in U.S. Patent No. 3,081,102, and will be illustrated hereinafter in conjunction therewith, it is appreciated that the instant tool may be employed in connection with other similar gaskets without departing from the scope of the instant invention.

As is well known to those versed in the art, soil-pipe gaskets are generally fabricated of rubberlike materials, and are necessarily of relatively heavy proportions so as to have considerable stiffness. Their insertion in soil pipe has heretofore required considerable manual strength and effort, as well as skill and experience. The difficulties in insertion of soil-pipe gaskets are compounded by the need for a covering of sealer material, which is relatively slippery, and is sometimes of a relatively quickly hardening type requiring rapid and accurate insertion technique. Furthermore, under adverse weather conditions, especially during relatively low atmospheric temperatures, soil-pipe gaskets assume a stiffness effectively prohibiting their insertion in pipe.

Accordingly, it is an important object of the present invention to provide a unique method of soil-pipe-gasket insertion, and highly improved tool for use therein, whereby persons of only average strength and skill may effectively manipulate soil-pipe gaskets under all conditions of use to quickly and easily insert the gaskets, as required, in soil pipe.

It is a further object of the present invention to provide apparatus having the advantageous characteristics mentioned in the preceding paragraph, which enables a soil-pipe gasket to be quickly and easily removed from its inserted position, as to rectify a mistake in gasket insertion, or the like.

It is another object of the present invention to provide a gasket-insertion tool for soil-pipe gaskets, which tool is simple in construction requiring a minimum of parts, durable and entirely reliable throughout a long useful life, and which can be economically manufactured for sale at a reasonable cost.

Other objects of the present invention will become apparent upon reading the following specification and referring to the accompanying drawings, which form a material part in this disclosure.

The invention accordingly consists in the features of construction, combinations and arrangements of parts and method steps, which will be exemplified in the following description and of which the scope will be indicated by the appended claims.

In the drawings:

FIGURE 1 is a top plan view of a gasket-insertion tool constructed in accordance with the teachings of the present invention;

FIGURE 2 is a side elevational view of the tool of FIGURE 1 in an early stage of the gasket-insertion procedure, illustrating relative movement of the tool in dot-and-dash outline;

FIGURE 3 is a partial longitudinal sectional view illustrating a slightly later stage in the instant insertion method;

FIGURE 4 is an end view taken generally from the left-hand side of FIGURE 3;

FIGURE 5 is a partial side elevational view illustrating a later stage in the instant insertion method;

FIGURE 6 is a longitudinal sectional view showing a fully inserted gasket;

FIGURE 7 is a top perspective view showing a gasket-insertion tool of the present invention; and FIGURE 8 is a side elevational view showing the gasket tool of the present invention as inverted and employed for gasket removal.

Referring now more particularly to the drawings, and particularly to FIGURES 1 and 2 thereof, a gasket-insertion tool is there generally designated 10, and includes a pair of crossed levers 11 and 12 pivotally connected together, as by a pin 13 at their cross-over region.

More particularly, the lever 11 includes a shank 15 extending generally radially from the pivot 13, and provided on its end remote from the shank with a handgrip means 16. The handgrip means 16 may include a hand or finger receiver 17 in the form of a generally ovaloid loop extending obliquely from the shank 15 and provided on its lower or underside with a laterally enlarged, generally flat pad 18 having a substantially flat bearing surface 19 on its underside. The bearing surface 19 is thus disposed generally oblique with respect to the shank 15.

On its inner end, the shank 15 is provided with a hub or journal 20 for rotatably receiving the pivot pin 13, and a single tine 21 extends from the hub 20, generally radially thereof away from the shank 15. The tine 21 has its outer or distal portion 22 offset so as to extend in substantial parallelism with the handgrip means 16 and pad 18, while the terminal portion 23 of the tine 21 may be pointed or outwardly tapered, for a purpose appearing presently.

It will now be apparent that the lever 11 is substantially coplanar in a vertical plane, as seen in FIGURE 1, the pivot 13 extending generally normal to the plane of lever 11.

The lever 12 includes a shank 25 extending generally radially away from the pivotal axis of pin 13, over the lever 11 and terminates remote from the pivot in a handgrip 26, which lies over the handgrip 16, as seen in FIGURE 1.

The inner end of shank 25 is provided with a generally U-shaped or bifurcated portion 27 having its bight region or yoke 28 extending preferably integrally from the shank 25 and defining a pair of laterally spaced legs or tines 29. As best seen in FIGURES 1, 2 and 7, the U-shaped portion 27 is astride the lower level 11, with respective tines 29 located on opposite sides of the hub 20 and inner or intermediate tine 21 of the lower lever. The tines 29 are each provided with an enlargement 30 for reception of respective ends of pivot 13, whereby the levers 11 and 12 are pivotally connected together.

It will now be appreciated that the levers 11 and 12 are swingable, say from the solid-line position of FIGURE 2 to the phantom position thereof, which is essentially the solid-line position of FIGURES 2–5 and 7. In such swinging movement the outer tines 29 are swung relative to the inner tine 21, so that the latter moves relatively through the space between the outer tines. In the solid-line position of FIGURES 3–5 and 7, the inner tine 21 has moved relatively downward through the space between the outer tines 29, and the distal inner-tine portion 22 is located in substantial parallelism with and offset downwardly from the substantially horizontal plane of the outer tines, for a purpose appearing presently.

In operation, the pair of outer tines 29 may be engaged through an annular flexible gasket 33, as shown in FIGURE 2. Upon relative swinging movement of the levers 11 and 12 between the solid and phantom positions shown in FIGURE 2, the gasket 33 is moved from a generally circular configuration to that shown in solid lines in FIGURE 4. In particular, the upper peripheral portion 34 of gasket 33 is engaged by the underside of tine 21 and displaced downwardly toward the lower, diametrically opposed gasket portion 35. Simultaneously, the laterally diametrically opposed gasket portions 36 are effectively held against relative displacement by engagement in the gasket of outer tines 29. This effects a double folding of the gasket 33, as best seen in FIGURE 4, the tine 21 having moved relatively downwardly in the direction of arrow 37 to engage upper and lower opposite gasket portions 34 and 35.

In this double-folded condition the gasket 33 may easily enter the mouth or bell of a pipe 38, as seen in FIGURE 5. Upon release of the levers 11 and 12, the gasket 33 will return to its annular position within the pipe or fitting 38, and a connection pipe 39 may be inserted therein, see FIGURE 6.

In order to exert an increased force on the gasket 33 for effecting the double folding thereof, the pad 18 may be rested with its bearing surface 19 on the ground or other supporting surface, and a user's weight effectively applied downwardly on the handgrip 26 of lever 12. In this condition, as seen in FIGURE 2, it will be apparent that the tines 21 and 29, as well as the gasket 33 are adequately spaced from the supporting surface for convenient operation.

As may happen, upon occasion, a gasket 33 may be inserted into a wrong type of fitting. By use of the instant tool, the pointed terminus 23 of tine 21 may probe between the mouth of fitting 38 and previously erroneously inserted gasket 33 to dislodge and remove the gasket, as illustrated in FIGURE 8. This operation requires only inversion of the tool 10 and manual gripping of the hand receiver 16 for convenient manipulation.

From the foregoing, it is seen that the present invention provides a method of gasket insertion, and tool for use therein which fully accomplish their intended objects and are well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:
1. A gasket-insertion tool comprising a first shank, a first handgrip extending longitudinally outwardly from one end of said first shank, a yoke extending longitudinally outwardly from the other end of said first shank, a pair of spaced tines extending from said yoke in general parallelism with each other and longitudinally outwardly from said first shank, a second shank having one end pivotally connected between said pair of tines adjacent to said yoke for relative swinging movement of said shanks, a second handgrip on the other end of said second shank and movable therewith toward and away from said first handgrip, and an additional tine on said one end of said second shank and movable therewith through the space between said pair of tines, said additional tine being bent to locate its outer portion generally parallel to and offset from the plane of said pair of tines upon movement through said space, whereby the outer portion of said additional tine folds a gasket extending about said pair of tines with minimum effort and the inner portion of said additional tine retains the gasket on said pair of tines.

2. A gasket-insertion tool according to claim 1, said second shank extending obliquely away from said first shank when said outer additional tine portion is generally parallel to said pair of tines, and said second handgrip including a generally flat portion extending generally parallel to said outer additional tine portion and facing away from said first handgrip, whereby said flat portion is engageable with a nether supporting surface for exerting increased force on said first handgrip with said tines spaced above said supporting surface.

References Cited

UNITED STATES PATENTS

| 89,044 | 4/1869 | Hatch | 294—118 X |
| 522,164 | 6/1894 | Lockwood | 140—106 |
| 1,268,922 | 6/1918 | Bryan | 72—389 |
| 1,762,486 | 6/1930 | Roden | 81—419 X |
| 1,824,219 | 9/1931 | Loveless | 72—409 X |
| 2,253,689 | 8/1941 | Dalley | 30—231 |
| 2,755,692 | 7/1956 | Wallshein | 72—389 |

FOREIGN PATENTS 912,008    5/1954    Germany.

OTHELL M. SIMPSON, *Primary Examiner.*